United States Patent
Nicolson

(10) Patent No.: US 7,249,173 B2
(45) Date of Patent: Jul. 24, 2007

(54) ABSTRACTED NODE DISCOVERY

(75) Inventor: Alex Nicolson, Costa Mesa, CA (US)

(73) Assignee: Emulex Design & Manufacturing Corporation, Costa Mesa, CA (US)

( * ) Notice: Subject to any disclaimer, the term of this patent is extended or adjusted under 35 U.S.C. 154(b) by 0 days.

(21) Appl. No.: 10/377,496

(22) Filed: Feb. 28, 2003

(65) Prior Publication Data

US 2004/0083285 A1 Apr. 29, 2004

Related U.S. Application Data

(60) Provisional application No. 60/421,185, filed on Oct. 25, 2002.

(51) Int. Cl.
*G06F 15/173* (2006.01)
*G06F 15/16* (2006.01)

(52) U.S. Cl. ............... 709/223; 709/224; 709/230; 709/245

(58) Field of Classification Search ......... 709/212, 709/213, 217, 218, 220, 223–224, 225, 229, 709/230, 245

See application file for complete search history.

(56) References Cited

U.S. PATENT DOCUMENTS

| | | | |
|---|---|---|---|
| 5,388,238 A | 2/1995 | McHarg et al. | |
| 5,504,899 A | 4/1996 | Raz | |
| 5,513,126 A | 4/1996 | Harkins et al. | |
| 5,761,444 A | 6/1998 | Ajanovic et al. | |
| 5,860,119 A | 1/1999 | Dockser | |
| 5,870,567 A | 2/1999 | Hausauer et al. | |
| 6,044,368 A | 3/2000 | Powers et al. | |
| 6,199,112 B1 * | 3/2001 | Wilson | 709/227 |
| 6,243,746 B1 * | 6/2001 | Sondur et al. | 709/220 |
| 6,308,205 B1 * | 10/2001 | Carcerano et al. | 709/221 |
| 6,347,334 B1 * | 2/2002 | Fredericks et al. | 709/220 |
| 6,430,635 B1 * | 8/2002 | Kwon et al. | 710/104 |
| 6,574,664 B1 * | 6/2003 | Liu et al. | 709/224 |
| 6,601,093 B1 * | 7/2003 | Peters | 709/220 |
| 6,643,693 B1 * | 11/2003 | Reynolds et al. | 709/223 |
| 6,665,714 B1 * | 12/2003 | Blumenau et al. | 709/222 |
| 6,892,264 B2 * | 5/2005 | Lamb | 710/301 |

OTHER PUBLICATIONS

Gibbons et al., "Internet Storage Name Service (iSNS)—A Technical Overview", Nishan Systems, Jun. 2001.*
Gibbons et al., "Internet Storage Name Service (iSNS)—A Technical Overview", Nishan Systems, Jun. 2001.*
Emulex Product Reference Guide, Jun. 2002, Costa Mesa, CA.
Emulex Web Page: "GN9000/V 1 Gb/s VI/IP © PCI Host Bus Adapter" Features and Description, 2001.

(Continued)

*Primary Examiner*—Ario Etienne
*Assistant Examiner*—Hussein El-chanti
(74) *Attorney, Agent, or Firm*—Morrison & Foerster LLP

(57) ABSTRACT

Systems and techniques to abstract a node discovery process. In general, in one implementation, the technique includes managing node discovery protocols in a network interface device such that a data processing system coupled with the network interface device need not implement the node discovery protocols to effect node discovery. The technique can further include providing the data processing system with block-level storage services and providing an initiator mode and a target mode.

23 Claims, 5 Drawing Sheets

OTHER PUBLICATIONS

Emulex Web Page: Press Release—"Emulex HBA Selected By Network Appliance For First DAFS-Based Database Storage Solution," Apr. 3, 2002, Costa Mesa, CA.

"SANPower I Solutions," www.bellmicro.com/SANPower/sanpowerI/product_showcase.htm, Feb. 25, 2002.

"The Critical Role of a Host Bus Adaptor (HBA in Storage Area Networks," Emulex Technology Brief, Apr. 2001.

"Storage Area Networking with Fibre Channel," www.emulex.com/products/white/fc/san.html, Feb. 25, 2002.

"Single Server Storage Configuration," www.emulex.com/intel/1_jbod.html, Feb. 25, 2002.

Ajay V. Bhatt, "Creating a Third Generation I/O Interconnect".

"How IDE Controllers Work," www.howstuffworks.com/ide2.htm, Apr. 17, 2002.

"Comparative I/O Positioning," Mellanox Technologies, www.mellanox.com/products.

"iSCSI Storage over IP," IBM.com/storage.

"How PCI Works," www.howstuffworks.com/pcil.htm, Apr. 17, 2002.

"PCI-X Addendum to the PCI Local Bus Specification," PCI Special Interest Group, Jul. 24, 2000.

Kevin Gibbons et al., "Internet Storage Name Service (iSNS)—A Technical Overview," 2001 Nishan Systems, pp. 3-18.

* cited by examiner

ABSTRACTED NODE DISCOVERY

CROSS REFERENCE TO RELATED APPLICATIONS

This application claims the benefit of the priority of U.S. Provisional Application Ser. No. 60/421,185, filed Oct. 25, 2002 and entitled "EMBEDDED DISCOVERY AGENT".

BACKGROUND

The present disclosure describes systems and techniques relating to discovering nodes on a network.

Traditional node discovery in a network can be implemented using one or more discovery protocols. For example, the Internet Small Computer System Interface (iSCSI) standard defines several methods by which iSCSI Initiators can discover Targets on an IP (Internet Protocol) network. Such methods include SendTarget, Service Location Protocol (SLP) and Internet Storage Name Service (iSNS). Traditional node discovery protocols are typically managed by the host operating system (OS).

SUMMARY

The present disclosure includes systems and techniques relating to abstracted node discovery. According to an aspect, node discovery protocols are managed in a network interface device such that a data processing system coupled with the network interface device need not implement the node discovery protocols to effect node discovery. The network interface device can provide the data processing system with block-level storage services, and the network interface device can provide both an initiator mode and a target mode.

According to another aspect, nodes are discovered on a network using node discovery protocols in a network interface device such that a data processing system coupled with the network interface device receives communication information relating to at least one of the nodes discovered by the network interface device, and the data processing system is provided with block-level storage access to the at least one of the discovered nodes over the network using one or more networking protocols.

An embedded discovery agent can be provided in a network interface device that abstracts and simplifies the discovery process. Abstracting the discovery process allows a data processing system to use multiple discovery protocols through a common program interface provided by the network interface device without needing to process details of the various discovery protocols. The network interface device can manage the details of multiple node discovery protocols and can present a unified view of the discovery process to the data processing system.

Details of one or more implementations are set forth in the accompanying drawings and the description below. Other features and advantages may be apparent from the description and drawings, and from the claims.

DRAWING DESCRIPTIONS

DETAILED DESCRIPTION

Figure 1:
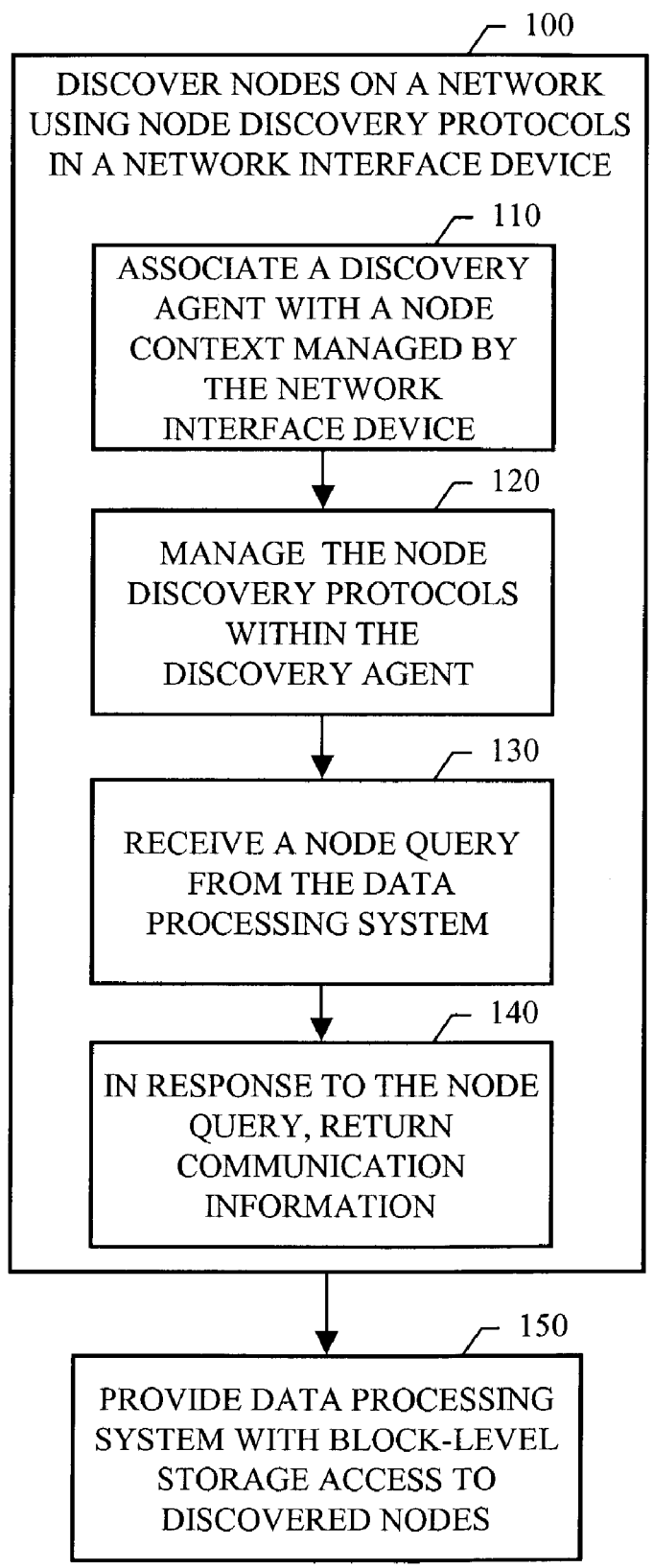
FIG. 1 is a flowchart illustrating abstracted node discovery in a network interface device.

FIG. 1 is a flowchart illustrating abstracted node discovery in a network interface device. Nodes on a network are discovered using multiple node discovery protocols at 100. The node discovery protocols are processed in a network interface device such that a data processing system coupled with the network interface device receives communication information relating to the nodes discovered by the network interface device.

This relieves the data processing system, such as a server and/or host computer system, from a need to understand details of the discovery process. For example, the network interface device can be a bus adapter that handles the node discovery process and presents a discovery abstraction through a program interface to the host computer system. Putting the discovery process into a bus adapter can reduce dependency on the host system for processing networking protocols and can reduce processing overhead on the host.

The network interface device can provide a program interface to the data processing system. This program interface presents the communication information in a format that conceals differences between the multiple node discovery protocols. This can result in reduced changes to the data processing system when discovery protocols change, and a simplified implementation of software on the multiple operating platforms that may need to be supported.

The data processing system can be provided with block-level storage access to discovered nodes at 150. The term "block-level" refers to the data storage units used on system-interconnect busses in data processing systems generally, and is not limited to any particular platform or file system. The network interface device can be a bus adapter that manages multiple iSCSI discovery protocols, such as iSNS, SLP, and the SendTarget functionality in the iSCSI protocol. The bus adapter can present communication information in a unified format, and can provide block-level storage access over an IP network using one or more networking protocols. The communication information can include IP address, a node's alias, authentication information, IP/DNS host name, TCP port and access list, and possibly user defined attributes.

Discovering the nodes can involve multiple operations. A discovery agent can be associated with a node context managed by the network interface device at 110. The node discovery protocols can be managed within the discovery agent in the network interface device at 120. A node query can be received from the data processing system at 130. In response to the node query, the communication information can be returned to the data processing system at 140.

These example operations need not be performed in this order. For example, a node query can be received before one of the node discovery protocols is used, such as when an initiator attempts to discover targets. The network interface device can receive a node discovery request and then manage the discovery protocol(s) needed to identify a target node.

The node discovery protocols can include a node registration protocol, a node identification protocol, and a connection discovery protocol. The node registration protocol can be used by a node registering as a target device, such as when a node registers with iSNS and/or SLP services. The node identification protocol can be used to discover the availability of a node on the network, such as when an initiator attempts to discover targets. The connection discovery protocol can be used to discover communication information needed to establish a session and associated connection(s) to a remote target.

Figure 2:
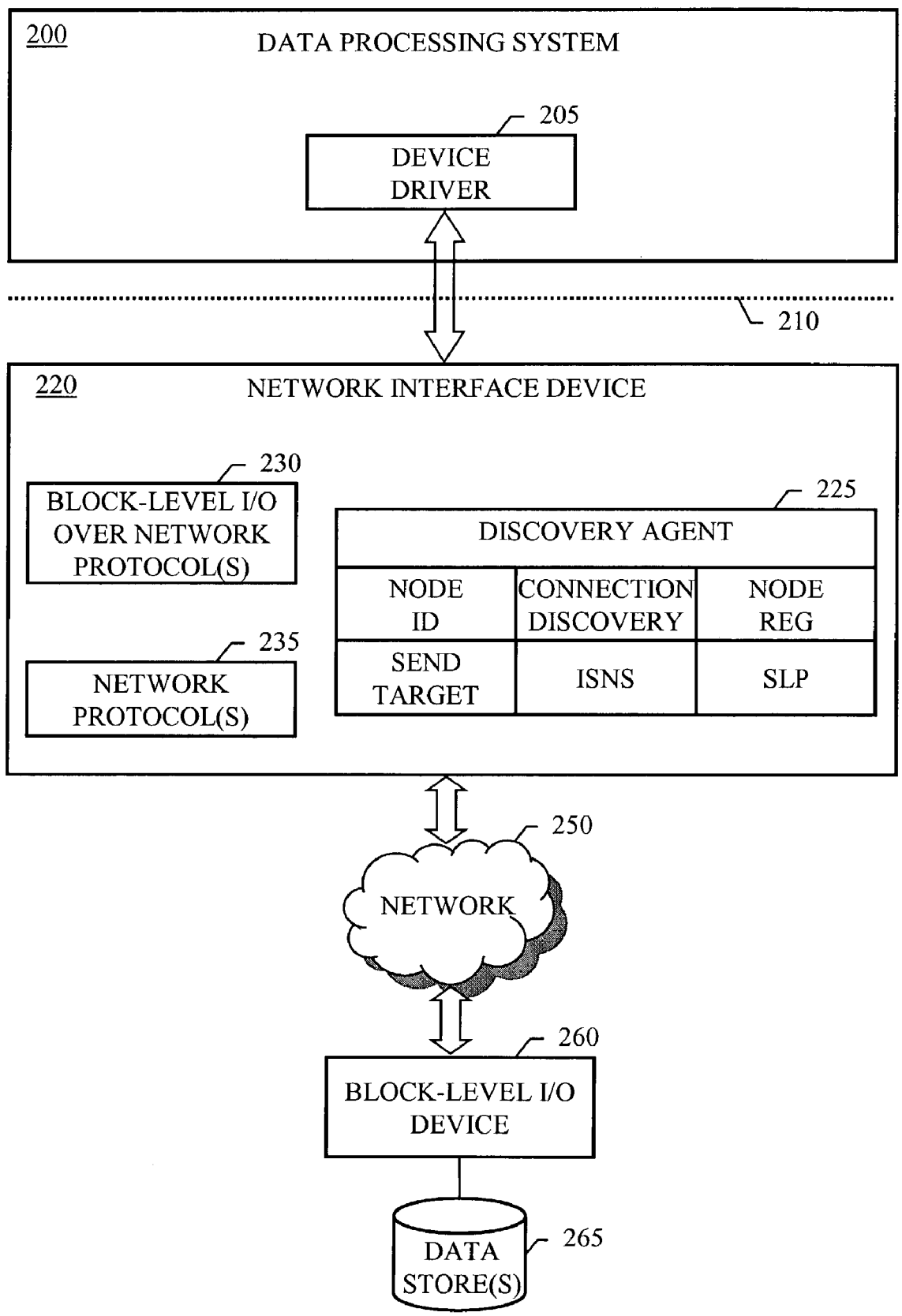
FIG. 2 is a block diagram illustrating components and operational interactions for a system implementing abstracted node discovery in a network interface device.

FIG. 2 is a block diagram illustrating components and operational interactions for a system implementing abstracted node discovery in a network interface device. A data processing system 200 includes a device driver 205 that allows processing system 200 to communicate through channel 210 with a network interface device 220. The channel 210 can be a standard bus architecture, such as PCI (Peripheral Component Interconnect), used to communicate over a system-interconnect bus. The channel 210 can also be enhanced using an additional interface level, such as SLI (Service Level Interface) provided by Emulex Corporation of Costa Mesa California, to support various server and storage solutions.

The network interface device 220 manages network protocol(s) 235, such as Transmission Control Protocol (TCP) and User Datagram Protocol (UDP), to communicate over a network 250 (e.g., TCP/UDP/IP over an IP network). In addition, the network interface device 220 manages block-level Input/Output (I/O) over network protocol(s) 230, such as iSCSI. Thus, the network interface device 220 can provide block-level I/O to a node made up of a block-level I/O device 260 and one or more data stores 265.

For example, a discovery agent 225 can be associated with a node context managed by the network interface device 220. In an iSCSI implementation, node identification can be performed in the discovery agent 225 using the SendTarget functionality in the iSCSI protocol, connection discovery can be performed using iSNS, and node registration can be performed using SLP. Other combinations of discovery protocol usage are also possible. Additionally, the system 200 can cause the discovery agent 225 to periodically issue a SEND_TARGET command to a remote target to identify targets and report back to the system 200; the system 200 can also control how often the discovery agent 225 sends these SEND_TARGET commands.

The discovery agent 225 can be an embedded iSCSI discovery agent that places various discovery protocols in firmware and provides a program interface between the data processing system 200 and the firmware in the network interface device 220. This program interface allows the data processing system 200 to initiate discovery and acquire discovery information without implementing the various discovery protocols. This reduces the burden on the system 200 to manage all the discovery protocols, particularly when multiple operating systems are supported. Moreover, as new discovery methods are introduced, updates to the data processing system 200 can be minimized.

The device 220 can automatically start node discovery upon an initialization. For example, an auto-discovery functionality can be provided such that node identification can automatically begin when an initiator is started. Additionally, a query from the data processing system 200 can cause the device 220 to initiate node identification.

The device driver 205 and/or management software can initiate separate node discovery queries. When queried by the data processing system 200, the discovery agent 225 can return information about discovered targets. This response can provide the same basic information regardless of the discovery protocol(s) used. The data processing system 200 can be relied on to determine whether a session has already been established or if a session should be defined and started.

The system 200 has no need to understand the various discovery protocols, although the system 200 may be provided various controls over how discovery protocols are used. The system 200 may fine-tune which discovery protocols are used by the device 220 for specific discovery processes and/or queries. The system 200 may override connection discovery, which can be used to establish multiple connections for a single session, by explicitly defining the connections. Regardless of this potential protocol control, the network interface device 220 abstracts the differences among the discovery protocols used and generates a canonical form for returning the discovered communication information.

This canonical form can include multiple fields, not all of which need to be defined for a particular delivery of discovered communication information. The fields may be defined in a fixed portion of a block of data (with reserved fields as well) used to deliver the discovered communication information to the data processing system. The fields may contain the information and/or indicate a location of the information in a variable portion of the block (i.e., the fields can contain length and offset descriptors). Table 1 below shows an example layout for such a fixed portion of a data block used to deliver the discovered communication information.

The fields may include a local IP index field, a source routing field, a session type field (e.g., normal or discovery session), a node type field (e.g., target or initiator), an initiator session ID type field, an initiator session ID naming authority field, an initiator session ID qualifier field, a target session ID field for the target, a target portal group field, an auto-start connections field, an active-connections field, a remote node name field, a remote node alias field, a primary IP address field, a connection table field and corresponding parameter specifying the number of entries in the table, a remote port indicator field, a discovery protocol used field, a network address of information supplier field, an authentication parameters field, a storage domain of discovered target field, and a session failure timer field.

TABLE 1

| | 31 30 29 28 27 26 25 24 23 22 21 20 19 18 17 16 15 14 13 12 11 10 9 8 7 6 5 4 3 2 1 0 | | | |
|---|---|---|---|---|
| Word 0 | HEADERSIZE | | RESERVED | SR SESTY NT PE |
| Word 1 | RESERVED | | NODE_INDEX (INITI or TARGETI) | |
| Word 2 | ISID Type | | ISID Naming Authority | |
| Word 3 | ISID Qualifier | | TSID | |
| Word 4 | TARGET_PORTAL_GROUP | | RESERVED | |

TABLE 1-continued

| | 31 30 29 28 27 26 25 24 23 22 21 20 19 18 17 16 15 14 13 12 11 10 9 8 7 6 5 4 3 2 1 0 | | |
|---|---|---|---|
| Word 5 | ISCSI_REV_MAX | | ISCSI_REV |
| Word 6 | AUTOSTART_CONNECTIONS | ACTIVECONNS DEFINEDCONNS | RESERVED |
| Word 7 | NAME_LOD | | |
| Word 8 | ALIAS_LOD | | |
| Word 9 | CONN_TABLE_LOD | | |
| Word 10 | SESSION_LOGIN_LOD | | |
| Word 11 | BASE_ADDRESS_LOD | | |
| Word 12 | RPI | RESERVED | DIS_PROTO |
| Word 13 | DISC_ADDRESS_LOD | | |
| Word 14 | PollCycle | | |
| Word 15 | DISCOVERY_DOMAIN | | |
| Word 16 | AUTHENTICATION_LOD | | |
| Word 17 | LIPI | | RESERVED |
| Word 18 | SFT | | RESERVED |
| Word 19-31 | RESERVED | | |
| Word L | NAME | | |
| Word M | ALIAS | | |
| Word N | CONN_TABLE | | |
| Word P | BASE_ADDRESS | | |
| Word Q | SESSION_LOGIN | | |
| Word R | Connection_Table1 | | |
| Word S | AUTHENTICATION_PARMS | | |
| Word T | DISC_ADDRESS | | |
| Word U | DISCOVERY_DOMAIN | | |

The local IP index field refers to the local IP index that contains the first connection of a session when source routing is set. The target portal group field can be generated by the device 220 so the system 200 does not have to parse the IP address fields. The auto-start connections field refers to a number used as the maximum number of connections to be started when starting a session. The connection table is an array of length and offset descriptors that point to a connection parameter data block. Table 2 below shows correspondence among various fields and discovery protocols for the example data block of Table 1.

TABLE 2

| ISCSI_NODE Field | SendTarget | SLP | iSNS | Incoming iSCSI Login |
|---|---|---|---|---|
| NAME LOD | TargetName= | iSCSI Name | iSCSI NAME (tag 32) | Initiator Name from Login Text |
| ALIAS LOD | N/A | N/A | Alias (tag 34) | Remote Alias BDE from Login Text |
| LOGIN LOD | | | | Initial Parameters from Login Text |
| BASE LOD | FirstAddress in Target Record or the address of the Target that supplied this name. | IO Address/ Port | IP Address/ Port (tag 16/17) | Address of TCP connection |

The network interface device 220 can support both initiator and target modes. Thus, the data processing system can also be a storage system, such as described below. The data block used to deliver the communication information can be used in initiator mode to log in into a remote target and to receive information regarding discovered iSCSI nodes; and it can be used in target mode, by the device 220, to pass information to the device driver 205 regarding remote initiators that are trying to login and, by the system 200, to accept login requests. The discovery information available to a particular initiator or target can depend on the identity of the querying initiator or target. Initiators and targets can be defined to have different discovery protocol parameters when the initiators and targets are configured.

The network interface device 220 can be a host bus adapter (HBA), a network interface card (NIC), a network file system (NFS) product, or a remote direct memory access (RDMA) bufferless NIC. The various components of the network interface device 220 can be implemented in logical components of an application specific integrated circuit (ASIC), firmware, and/or software.

Figure 3:
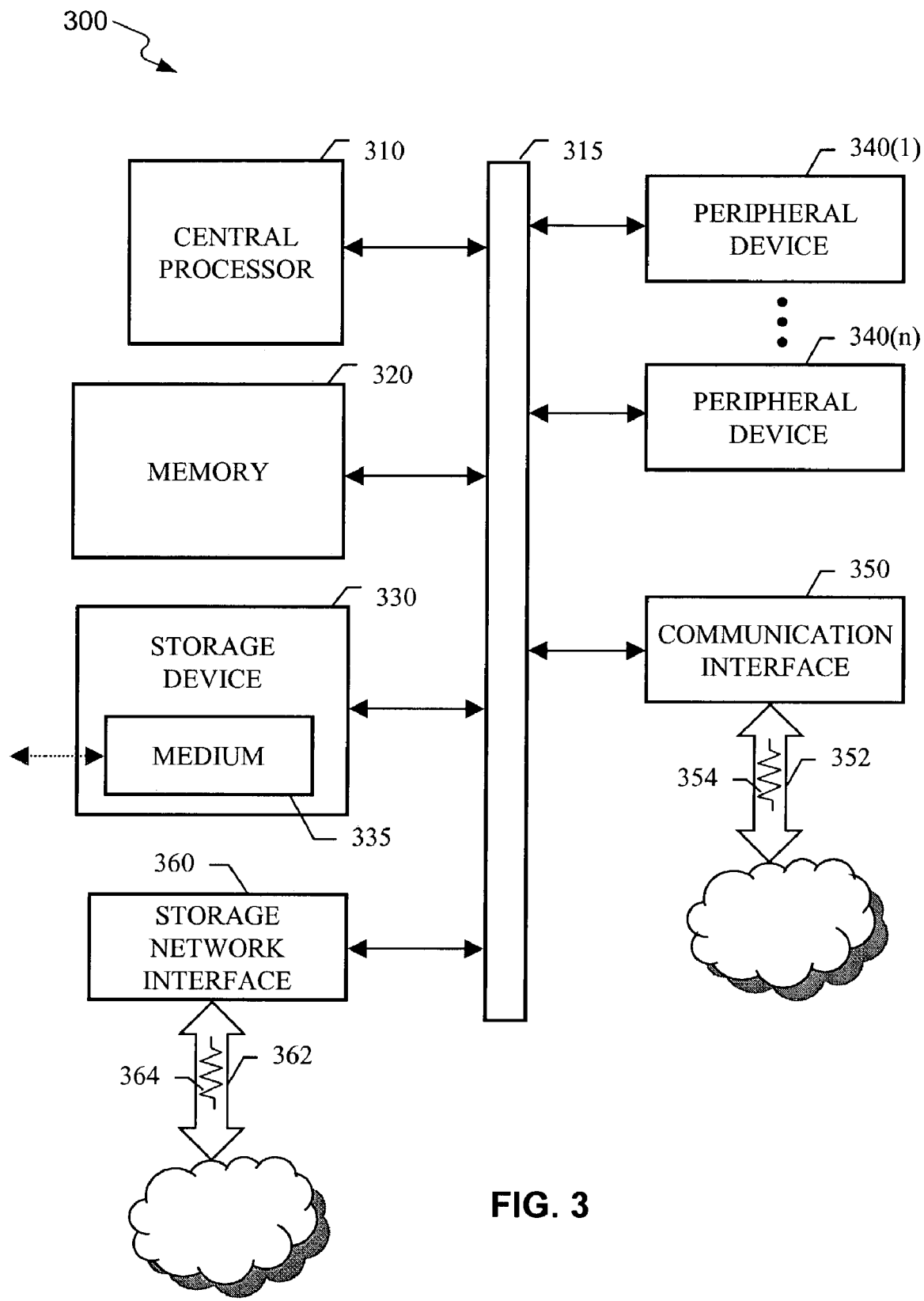
FIG. 3 is a block diagram illustrating an example data processing system.

FIG. 3 is a block diagram illustrating an example data processing system 300. The data processing system 300 includes a central processor 310, which executes programs, performs data manipulations and controls tasks in the system 300. The central processor 310 can include multiple processors or processing units and can be housed in a single chip (e.g., a microprocessor or microcontroller) or in multiple chips using one or more printed circuit boards and/or other inter-processor communication links (i.e., two or more discrete processors making up a multiple processor system).

The central processor 310 is coupled with a system-interconnect bus 315. The system-interconnect bus 315 provides one or more pathways through which data is transmitted among portions of the system 300. The system-interconnect bus 315 can include multiple separate busses, which can be parallel and/or serial busses, bus interfaces, and/or bus bridges. Each bus may have an address bus and a data bus. The system-interconnect bus 315 can include one or more system-interconnect bus architectures (e.g., PCI, Peripheral Component Interconnect Extended (PCI-X), industry standard architecture (ISA), extended ISA (EISA), Accelerated Graphics Port (AGP), Universal Serial Bus (USB), SCSI (Small Computer System Interface), future bus architectures).

The data processing system 300 includes a memory 320, which is coupled with the system-interconnect bus 315. The system 300 can also include one or more cache memories. These memory devices enable storage of instructions and data close to the central processor 310 for retrieval and execution.

The memory 320 can include a non-volatile memory and a volatile memory. For example, a non-volatile memory can be used to store system firmware, which can be used to handle initialization of the data processing system 300 and loading of an operating system (OS), such as Windows® 2000, provided by Microsoft Corporation of Redmond Wash., Solaris® 8, provided by Sun Microsystems, Inc. of Palo Alto Calif., HP-UX, provided by HP of Palo Alto Calif., AIX®, provided by International Business Machines Corporation of Armonk N.Y., or Linux, a freely-distributable open source implementation of UNIX. The volatile memory, which requires a steady flow of electricity to maintain stored data, can be used to store instructions and data once the system 300 starts up.

The data processing system 300 can include a storage device 330 for accessing a medium 335, which is a machine-readable medium containing machine instructions, such as instructions for causing the system 300 or components of the system 300 to perform operations. The medium 335 can be removable and can include a boot media having OS instructions and data that are loaded into the volatile memory when the system 300 boots up. The medium 335 can be read-only or read/write media and can be magnetic-based, optical-based, semiconductor-based media, or a combination of these. Examples of the storage 330 and the medium 335 include a hard disk drive and hard disk platters, which may be removable, a floppy disk drive and floppy disk, a tape drive and tape, and an optical disc drive and optical disc (e.g., laser disk, compact disc, digital versatile disk).

The data processing system 300 can also include one or more peripheral devices 340(1)-340(n) (collectively, devices 340), and one or more controllers and/or adapters for providing interface functions. The devices 340 can be additional storage devices and media as described above, other storage interfaces and storage units, adaptors, input devices and/or output devices. For example, the system 300 can include a display system having a display device (e.g., a video display adapter having components for driving a display, including video random access memory (VRAM), buffer, and graphics engine).

The system 300 can include a communication interface 350, which allows software and data to be transferred, in the form of signals 354, between the system 300 and external devices, networks or information sources. The signals 354 can be any signals (e.g., electronic, electromagnetic, optical) capable of being received on a channel 352 (e.g., wire, cable, optical fiber, phone line, infrared (IR) channel, radio frequency (RF) channel, etc.). The signals 354 can embody instructions for causing the system 300 or components of the system 300 to perform operations.

The communication interface 350 can be a communications port, a telephone modem or wireless modem. The communication interface 350 can be a network interface card (e.g., an Ethernet card connected with an Ethernet Hub), and may be designed for a particular type of network, protocol and channel medium, or may be designed to serve multiple networks, protocols and/or channel media. Moreover, the communication interface 350 may provide network stack processing offload for the central processor 310.

The system 300 includes a storage network interface 360, which allows software and data to be transferred, in the form of signals 364, between the system 300 and a storage area network. The signals 364 can be any signals, such as the signals 354, capable of being transmitted and received on a channel 362. The signals 364 can embody instructions for causing the system 300 or components of the system 300, such as the storage network interface 360, to perform operations.

The storage network interface 360 provides discovery protocol processing for the central processor 310 and may support iSCSI. The storage network interface 360 can be a host bus adapter, such as shown and described in connection with FIG. 4 below.

When viewed as a whole, the system 300 is a programmable machine. Example machines represented by the system 300 include a server (e.g., an application server or a storage server), a personal computer, a mainframe, and a supercomputer. The machine 300 can include various devices such as embedded controllers, Programmable Logic Devices (PLDs) (e.g., PROM (Programmable Read Only Memory), PLA (Programmable Logic Array), GAL/PAL (Generic Array Logic/Programmable Array Logic)), Field Programmable Gate Arrays (FPGAs), ASICs (application specific integrated circuits), single-chip computers, smart cards, or the like.

Machine instructions (also known as programs, software, software applications or code) can be stored in the machine 300, in a storage area network coupled with the storage network interface 360, and/or delivered to the machine 300 over a communication interface. These instructions, when executed, enable the machine 300 to perform features and function described above. These instructions represent controllers of the machine 300 and can be implemented in a high-level procedural and/or object-oriented programming language, and/or in assembly/machine language. Such languages may be compiled and/or interpreted languages.

As used herein, the term "machine-readable medium" refers to any computer program product, apparatus and/or device used to provide information indicative of machine instructions and/or data to the machine 300, including a machine-readable medium that receives machine instruction as a machine-readable signal. Examples of a machine-readable medium include the medium 335, the memory 320, and/or PLDs, FPGAs, ASICs, and the like. The term "machine-readable signal" refers to any signal, such as the signals 354, used to provide machine instructions and/or data to the machine 300.

Figure 4:
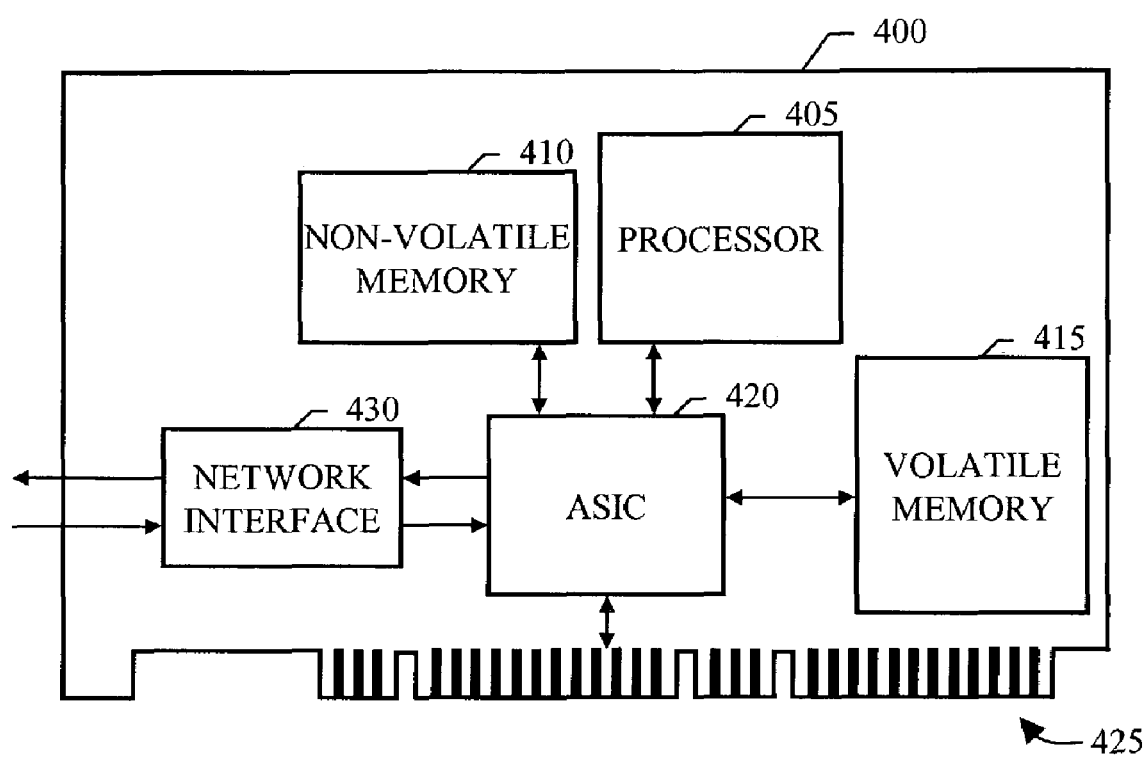
FIG. 4 is a block diagram illustrating a host bus adapter card according to one implementation.

FIG. 4 is a block diagram illustrating a host bus adapter card 400 according to one implementation. The host bus adapter card 400 is configured to be inserted into an existing processing system to provide an interface to a storage area network, providing block-level I/O services. The host bus adapter 400 includes a processor 405, which can be an SA-110 StrongARM processor, provided by Intel Corporation, located at 2200 Mission College Boulevard Santa Clara Calif. 95052-8119.

The host bus adapter 400 also includes a non-volatile memory 410 and a volatile memory 415. The non-volatile memory 410 may be a flash memory. The volatile memory 415 may be a high-speed SRAM(Static Random Access Memory)-based memory device, such as a QDR (Quad Data Rate) SRAM with a dedicated read port and a dedicated write port. The volatile memory 415 may be used to store transmit and receive payload data as well as to store network and bus context information and processor data (e.g., code, stack and scratch data).

The host bus adapter 400 also includes a bus adapter ASIC 420. This bus adapter ASIC 420 connects the processor 405, the non-volatile memory 410 and the volatile memory 415 with a system-interconnect bus interface 425 and a network interface 430. The bus adapter ASIC 420 may be implemented using various circuitry components, including random access memory, multiple first-in-first-out (FIFO) memories, including dedicated management circuitry for the FIFO memories, a DMA (Direct Memory Access) arbitrator, which controls access to the system-interconnect bus interface 425, a register bus, and a controller for coordinating and orchestrating the activity of the ASIC 420.

Moreover, the ASIC 420 can be made to emulate the designs of multiple manufactures to improve interoperability with various components to be connected to the host bus adapter 400. For example, the host bus adapter 400 can be made to support multiple OS/platforms, such as described above. The system-interconnect bus interface 425 can be configured to connect with a parallel bus, such as a PCI bus. The network interface 430 can be configured to connect with a defined network, such as an IP network.

The bus adapter shown and described above in connection with FIG. 4 is presented as example only. Other bus adapters, as well as entirely different devices, may use the systems and techniques described here.

In general, a bus adapter provides I/O processing and physical connectivity between a data processing system, such as a server, and storage. The storage can be attached using a variety of direct attached or storage networking technologies. In the example host bus adapter shown and described in connection with FIG. 4, the host bus adapter includes a processor, a protocol controller ASIC, and buffer memory to maintain data flow. This host bus adapter takes block-level data from a parallel I/O channel (e.g., PCI) and maps it to a routable protocol (e.g., TCP/IP over Ethernet).

The host bus adapter can be the network interface device from FIG. 2. This device can implement the iSCSI and TCP/IP protocols in firmware using the discovery protocol abstraction systems and techniques described above and can result in high throughput, low latency, and reduced CPU overhead. By encapsulating SCSI protocols in standard TCP/IP packets, block-level data can be reliably transported over existing network infrastructure, such as Gigabit Ethernet and IP-based systems. Moreover, the host bus adapter can support both initiator (host) and target (storage device) modes.

Figure 5:
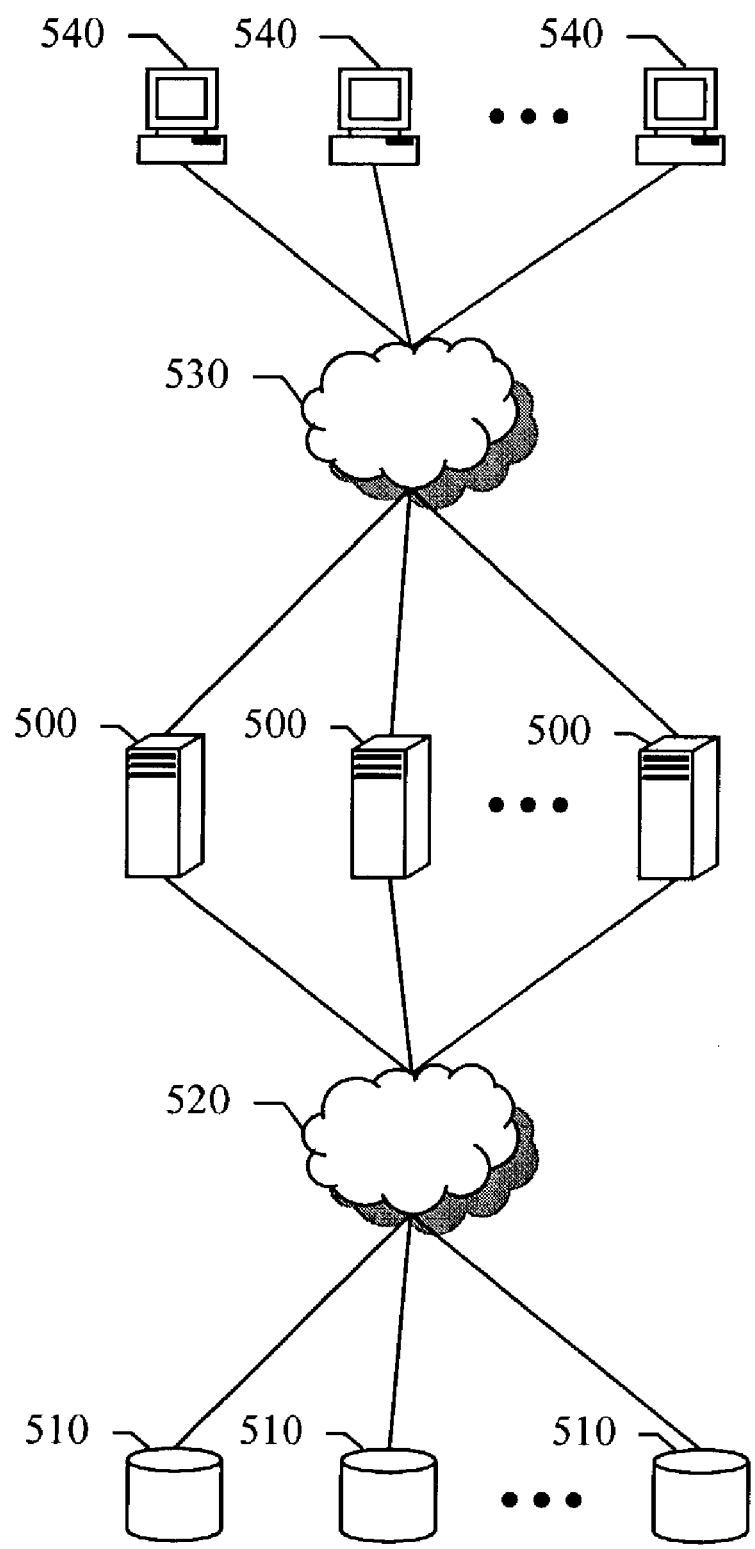
FIG. 5 is a block diagram illustrating an operational environment for a system using node discovery protocol abstraction according to one implementation.

FIG. 5 is a block diagram illustrating an operational environment for a system using node discovery protocol abstraction according to one implementation. Multiple servers 500 are connected with a storage area network. A server 500 can be implemented in the manner shown and described above.

The storage area network includes multiple storage systems 510 and a storage network 520. The storage network 520 can be a high-speed network dedicated to data storage. For example, the storage network 520 can be an IP network using gigabit Ethernet transport. Each storage system 510 can be a storage array using SCSI and PCI, JBOD (Just a Bunch of Disks), a RAID (Redundant Array of Inexpensive Disks) enclosure, or other mass storage device. In general, a storage system 510 includes at least one machine-readable medium as defined above, and the storage area network provides block-level I/O access to the shared storage systems 510 for the servers 500.

Servers 500 are connected with a network 530, which can include multiple machine networks, such as Ethernet networks, IP networks, and/or ATM (Asynchronous Transfer Mode) networks. The network 530 can be a private network, a virtual private network, an enterprise network, a public network, and/or the Internet. The network 530 provides a communication link among multiple clients 540 and the servers 500. The networks 520, 530 may overlap.

Various implementations of the systems and techniques described here can be realized in digital electronic circuitry, integrated circuitry, specially designed ASICs, computer hardware, firmware, software, and/or combinations thereof. The various implementations described above have been presented by way of example only, and not limitation. Other systems, architectures, and modifications and/or reconfigurations of devices, machines and systems shown are also possible.

Other embodiments may be within the scope of the following claims.

What is claimed is:

1. A method comprising:
    discovering nodes on a network using a node discovery protocol in a network interface device capable of invoking multiple node discovery protocols over the network through use of a common program interface that abstracts details of the multiple node discovery protocols from a data processing system coupled with the network interface device wherein said discovering enables the data processing system to receive communication information relating to at least one of the nodes discovered by the network interface device; and
    providing the data processing system with block-level storage access to the at least one of the discovered nodes over the network via the network interface device,
    receiving a node query from the data processing system; and
    in response to the node query, returning the communication information;
    wherein the node discovery protocols comprise at least three node discovery protocols comprising:
    a node registration protocol registering the discovered devices;
    a node identification protocol discovering the availability of the discovered node on the network; and
    a connection discovery protocol discovering communication information needed to establish a session to the discovered device;
    and wherein the network interface device and the data processing system are part of a single generally programmable machine computer, and the network interface device is an application specific hardware component of the generally programmable computer and is not itself a generally programmable computer.

2. The method of claim 1, wherein said discovering nodes on the network using the node discovery protocols in the network interface device comprises:
    associating a discovery agent with a node context managed by the network interface device;
    managing the node discovery protocols within the discovery agent.

3. The method of claim 2, wherein the at least three node discovery protocols comprise a SendTarget functionality in an Internet Small Computer Systems Interface (iSCSI) protocol, an Internet Storage Name Service (iSNS) protocol, and a Service Location Protocol (SLP).

4. The method of claim 1, wherein the nodes comprise at least one Small Computer Systems Interface (SCSI) device and at least one data store.

5. The method of claim 4, wherein the network comprises an Internet Protocol (IP) network, the communication information comprises an IP address, and said providing the data processing system with block-level storage access comprises providing iSCSI protocol support in the network interface device.

6. The method of claim 5, wherein the data processing system comprises a server.

7. The method of claim 5, wherein the network interface device comprises a host bus adapter.

8. A machine-readable medium storing information indicative of instructions when executed, perform the steps comprising:
 discovering nodes on a network using a node discovery protocol in a network interface device capable of invoking multiple node discovery protocols over the network through use of a common program interface that abstracts details of the multiple node discovery protocols from a data processing system coupled with the network interface device, wherein said discovering enables the data processing system to receive communication information relating to at least one of the nodes discovered by the network interface device; and
 providing the data processing system with block-level storage access to the at least one of the discovered nodes over the network via the network interface device using at least one block-level data transfer compatible networking protocol,
 wherein the network interface device and the data processing system are part of a single generally programmable machine computer, and the network interface device is an application specific hardware component of the generally programmable computer and is not itself a generally programmable computer;
 receiving a node query from the data processing system; and
 in response to the node query, returning the communication information;
 wherein the node discovery protocols comprise at least three node discovery protocols comprising:
 a node registration protocol registering the discovered devices;
 a node identification protocol discovering the availability of the discovered node on the network; and
 a connection discovery protocol discovering communication information needed to establish a session to the discovered device.

9. The machine-readable medium of claim 8, wherein said discovering nodes on the network using the node discovery protocols in the network interface device comprises:
 associating a discovery agent with a node context managed by the network interface device;
 managing the node discovery protocols within the discovery agent.

10. The machine-readable medium of claim 9, wherein the node discovery protocols comprise a SendTarget functionality in an Internet Small Computer Systems Interface (iSCSI) protocol, an Internet Storage Name Service (iSNS) protocol, and a Service Location Protocol (SLP).

11. The machine-readable medium of claim 10, wherein the nodes comprise at least one Small Computer Systems Interface (SCSI) device and at least one data store.

12. The machine-readable medium of claim 11, wherein the network comprises an Internet Protocol (IP) network, the communication information comprises an IP address, and said providing the data processing system with block-level storage access comprises providing iSCSI protocol support in the network interface device.

13. The machine-readable medium of claim 12, wherein the network interface device comprises a host bus adapter.

14. A network interface device comprising:
 a processor coupled with the network interface device system;
 an embedded discovery agent operationally coupled with the processor, the embedded discovery agent discovering nodes on a network by invoking multiple node discovery protocols over the network and abstracting a discovery process for a data processing system by abstracting details of the multiple node discovery protocols from the data processing system wherein said discovering enables the data processing system to receive communication information relating to at least one of the nodes discovered by the network interface device, the embedded discovery agent providing an initiator mode and a target modes, said processor providing the data processing system with block-level storage access to the at least one of the discovered nodes over the network via the network interface device;
 a bus interface operationally coupled with the embedded discovery agent for communicating with the data processing system; and
 a network interface operationally coupled with the embedded discovery agent, wherein:
 the network interface device and the data processing system are part of a generally programmable computer, and the network interface device is a specific hardware component of the generally programmable computer and is not itself a generally programmable computer;
 said network interface device receives a node query from the data processing system; and in response to the node query, returns the communication information;
 the node discovery protocols comprise at least three node discovery protocols comprising:
 a node registration protocol registering the discovered devices;
 a node identification protocol discovering the availability of the discovered node on the network; and
 a connection discovery protocol discovering communication information needed to establish a session to the discovered device.

15. The network interface device of claim 14, wherein the embedded discovery agent comprises an embedded Internet Small Computer Systems Interface (iSCSI) discovery agent that provides a program interface that allows the data processing system to initiate discovery and acquire discovery information without implementing the discovery protocols.

16. The network interface device of claim 15, wherein the data processing system comprises a storage system.

17. The network interface device of claim 15, wherein the discovery protocols comprise a SendTarget functionality in an iSCSI protocol, an Internet Storage Name Service (iSNS) protocol, and a Service Location Protocol (SLP).

18. A network interface device comprising:
 means for discovering nodes on a network by invoking three or more node discovery protocols in the network interface device over the network using a program interface; said program interface abstracting details of the three or more node discovery protocols from a data processing system coupled with the network interface device to receive communication information relating to at least one of the nodes discovered by the network interface device;
 means for supplying discovered communication information to the data processing system in a format that conceals differences among the three or more node discovery protocols; and means for providing the data processing system with block-level storage services, wherein the network interface device and the data processing system are part of a single generally programmable computer, and the network interface device is an application specific hardware component of the generally programmable computer and is not itself a generally programmable computers:

means for receiving a node query from the data processing system; and means for returning the communication information in response to the node query;

wherein the three or more node discovery protocols comprise at least:

a node registration protocol registering the discovered devices;

a node identification protocol discovering the availability of the discovered node on the network; and a connection discovery protocol discovering communication information needed to establish a session to the discovered device.

19. The network interface device of claim 18, further comprising means for operating in an initiator mode or a target mode.

20. A generally programmable computer comprising:
a data processing system including a parallel bus;
a storage area network; and
a network interface device coupled with the parallel bus and with the storage area network, the network interface device comprising a processor, an embedded discovery agent operationally coupled with the processor the discovery agent discovering nodes on a network by invoking multiple node discovery protocols over the storage area network to manage discovery protocols and abstracting a discovery process for a data processing system coupled with the network interface device over the parallel bus by abstracting details of the multiple node discovery protocols from the data processing system, wherein said discovering enables the data processing system to receive communication information relating to at least one of the nodes discovered by the network interface device, a bus interface coupled with the parallel bus, and a network interface coupled with the storage area network, said processor providing the data processing system with block-level storage access to the at least one of the discovered nodes over the storage area network via the network interface device;

wherein;
the network interface device is a specific hardware component of the generally programmable computer and is not itself a generally programmable computers;

said network interface device receives a node query from the data processing system; and in response to the node query, returns the communication information;

the node discovery protocols comprise at least three node discovery protocols comprising:

a node registration protocol registering the discovered devices;

a node identification protocol discovering the availability of the discovered node on the network; and a connection discovery protocol discovering communication information needed to establish a session to the discovered device.

21. The system of claim 20, wherein the embedded discovery agent provides an initiator mode and a target mode.

22. The system of claim 21, wherein the embedded discovery agent comprises an embedded Internet Small Computer Systems Interface (iSCSI) discovery agent that provides a program interface.

23. The system of claim 22, wherein the discovery protocols comprise a SendTarget functionality in an iSCSI protocol, an Internet Storage Name Service (iSNS) protocol, and a Service Location Protocol (SLP).

* * * * *